US012589929B2

(12) United States Patent
Benson et al.

(10) Patent No.: US 12,589,929 B2
(45) Date of Patent: Mar. 31, 2026

(54) RECYCLABLE BLANKS AND CONTAINERS MADE THEREFROM HAVING CONTROLLED FLUID PERMEABILITY

(71) Applicant: WESTROCK MWV, LLC, Atlanta, GA (US)

(72) Inventors: John D. Benson, North Charleston, SC (US); William T. Mcdonnell, Elmhurst, IL (US)

(73) Assignee: WestRock MWV, LLC, Atlanta, GA (US)

( * ) Notice: Subject to any disclaimer, the term of this patent is extended or adjusted under 35 U.S.C. 154(b) by 729 days.

(21) Appl. No.: 17/878,195

(22) Filed: Aug. 1, 2022

(65) Prior Publication Data

US 2023/0029699 A1 Feb. 2, 2023

Related U.S. Application Data

(60) Provisional application No. 63/228,446, filed on Aug. 2, 2021.

(51) Int. Cl.
| | |
|---|---|
| *B32B 29/00* | (2006.01) |
| *B65D 65/42* | (2006.01) |
| *B65D 81/26* | (2006.01) |

(52) U.S. Cl.
CPC ........... *B65D 65/42* (2013.01); *B65D 81/264* (2013.01); *B32B 29/00* (2013.01)

(58) Field of Classification Search
CPC ...... B65D 65/42; B65D 81/264; D21H 19/84; D21H 27/10; B32B 29/00
See application file for complete search history.

(56) References Cited

U.S. PATENT DOCUMENTS

2018/0265274 A1* 9/2018 Damarell .................. B32B 7/03

FOREIGN PATENT DOCUMENTS

| | | |
|---|---|---|
| GB | 2560718 A | 9/2018 |
| WO | 94/26513 A1 | 11/1994 |
| WO | 2013/075918 A1 | 5/2013 |

OTHER PUBLICATIONS

PCT International Search Report and Written Opinion dated Feb. 3, 2023, issued during the prosecution of PCT International Patent Application No. PCT/US2022/039093.

* cited by examiner

*Primary Examiner* — Hoa (Holly) Le
(74) *Attorney, Agent, or Firm* — Neil G. Cohen; Rohini K. Garg

(57) ABSTRACT

A blank for a package can include a substrate comprising a recyclable paper, the substrate having a first side and a second side opposite the first side. The blank can include one or more recyclable fluid resistant layers on the first side of the substrate configured to prevent water and/or oxygen from passing through to the substrate. The one or more recyclable fluid resistant layers can be configured to be an outside of the package. The blank can include a recyclable fluid permeable layer disposed on the second side and configured to allow a controlled amount of a fluid transmissibility and/or absorption by or through the fluid permeable layer.

20 Claims, 1 Drawing Sheet

RECYCLABLE BLANKS AND CONTAINERS MADE THEREFROM HAVING CONTROLLED FLUID PERMEABILITY

CROSS-REFERENCE TO RELATED APPLICATIONS

The present application claims the benefit of priority to U.S. Provisional Patent Application Ser. No. 63/228,446 filed on Aug. 2, 2021, the entire contents of which is incorporated herein by reference in its entirety.

FIELD

This disclosure relates to recyclable blanks and containers made therefrom.

BACKGROUND

Current boxes, e.g., for frozen food items, are wax coated. First, an outside is coated with wax. It is then flipped over and the inside of the box is coated. The inside coating is intentionally modified to create micro-holes in the coating (e.g., on the side a frozen fish filet touches). The reason for these holes is to cause water in the fish to go through microholes to absorb water and avoid freezer burn. Also, the holes allow easier release when the package is opened because the fish has less surface area in contact with the wax surface. These boxes are not recyclable due to wax coating.

Such conventional methods and systems have generally been considered satisfactory for their intended purpose. However, there is still a need in the art for improved blanks and containers made therefrom. The present disclosure provides a solution for this need.

SUMMARY

A blank for a package can include a substrate comprising a recyclable paper, the substrate having a first side and a second side opposite the first side. The blank can include one or more recyclable fluid resistant layers on the first side of the substrate configured to prevent water and/or oxygen from passing through to the substrate. The one or more recyclable fluid resistant layers can be configured to be an outside of the package. The blank can include a recyclable fluid permeable layer disposed on the second side and configured to allow a controlled amount of a fluid transmissibility and/or absorption by or through the fluid permeable layer.

In certain embodiments, the recyclable fluid permeable layer can have or provide a 30-minute Cobb absorption rating of about 10 g/m² to 15 g/m², for example. In certain embodiments, the recyclable fluid permeable layer can be made of acrylic (e.g., configured to provide a desired Cobb rating).

The recyclable fluid permeable layer can have a coat weight of about 1.5 lbs/MSF to about 2.5 lbs/MSF, for example. For example, the recyclable fluid permeable layer can have a coat weight of about 2 lbs/MSF. In certain embodiments, the recyclable fluid permeable layer can be the only layer on the second side of the substrate.

The one or more recyclable fluid resistant layers can have or provide a 30-minute Cobb of less than about 2 g/m². For example, in certain embodiments, the one or more recyclable fluid resistant layers have or provides a 30-minute Cobb of about 0 g/m² such that the one or more recyclable fluid resistant layers are substantially water impermeable.

In certain embodiments, the one or more recyclable fluid resistant layers include at least two layers (e.g., on the exterior side of the board). The at least two layers can include a first layer disposed on the substrate, and a second layer disposed on the first layer. The at least two layers can be polymeric layers, for example (e.g., configured to provide water vapor or oxygen impermeability or other desired Cobb rating).

In certain embodiments, the first layer can include pigment. In certain embodiments, the first layer can be an adhesive backed double reflective air and vapor control layer (AVCL) and is bonded to the substrate with the coating. For example, the first layer can be VaporBase™ 200 Polymeric Coating sold by Michelman, Inc. of 9080 Shell Road, Cincinnati, OH 45236-1299 USA. In certain embodiments, the second layer can be VaporCoat® 2200R sold by Michelman, Inc. of 9080 Shell Road, Cincinnati, OH 45236-1299 USA. Any other suitable water resistant coatings (e.g., polymer coatings) for the first layer and/or second layer are contemplated herein.

In certain embodiments, the substrate can be paperboard. The substrate can include a coat weight of about 60 lbs/MSF. The paperboard can be 100% virgin paperboard. Any other suitable substrate (e.g., made of a water absorptive material) is contemplated herein.

In accordance with at least one aspect of this disclosure, a container for holding a frozen item can include a substrate comprising a recyclable paper, one or more recyclable fluid resistant layers, and a recyclable fluid permeable layer as described above with respect to embodiments of a blank. The container can be configured such that the recyclable fluid permeable layer is an inside surface on which the frozen item sits. In certain embodiments, the frozen item is a frozen fish filet.

A method for forming a blank can include comprising coating a first side of a water absorptive substrate with one or more recyclable water resistant or recyclable water impermeable layers, and coating a second side of the substrate with a recyclable fluid permeable layer having a controlled amount of fluid permeability (e.g., water and/or oxygen vapor) configured to allow a controlled amount of a fluid transmissibility and/or absorption by or through the fluid permeable layer. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
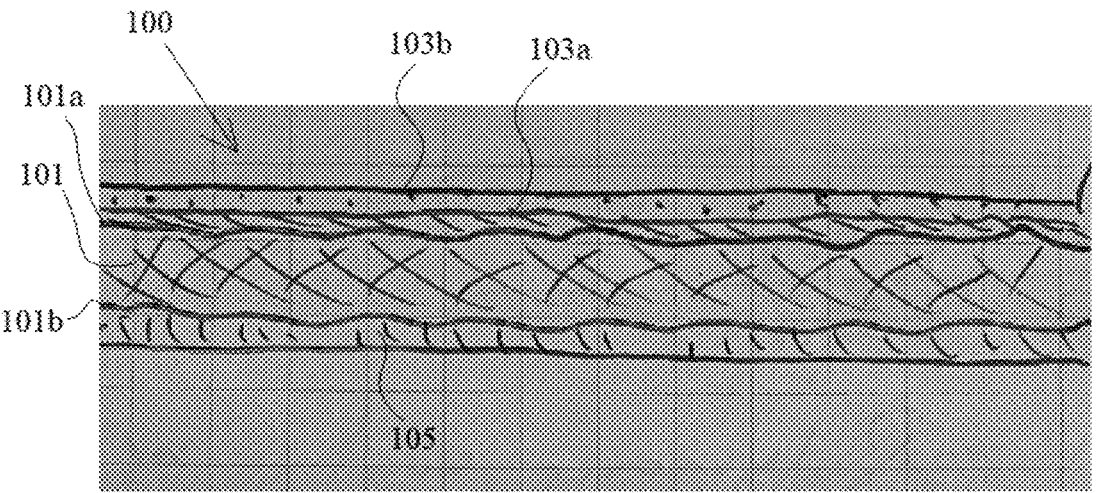
FIG. 1 is a cross-sectional schematic of an embodiment of a blank in accordance with this disclosure.
Figure 2:
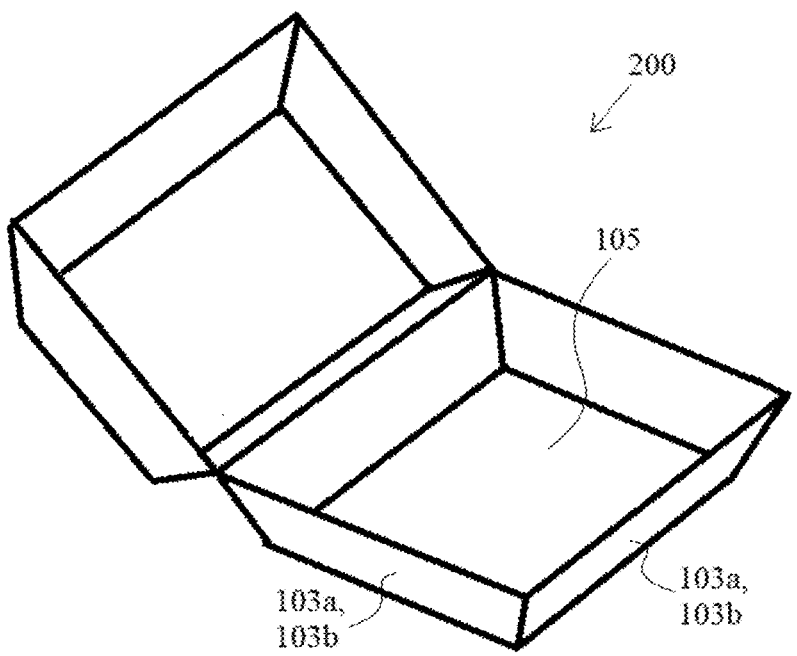
FIG. 2 is a perspective view of an embodiment of a container in accordance with this disclosure.

Reference will now be made to the drawings wherein like reference numerals identify similar structural features or aspects of the subject disclosure. For purposes of explanation and illustration, and not limitation, an illustrative view of an embodiment of a blank in accordance with the disclosure is shown in FIG. 1 and is designated generally by reference character 100. Other embodiments and/or aspects of this disclosure are shown in FIG. 2. Certain embodiments described herein can be used to provide packaging for frozen food items (e.g., frozen fish fillets) or any other suitable item).

Referring to FIG. 1, a blank 100 for a package (e.g., package 200 as shown in FIG. 2) can include a substrate 101 comprising a recyclable paper. The substrate 101 having a first side 101*a* and a second side 101*b* opposite the first side 101*a*. In certain embodiments, the substrate 101 can be paperboard. In certain embodiments, the paperboard can be 100% virgin paperboard. Any other suitable substrate (e.g., made of a recyclable water absorptive material) is contemplated herein. The blank 100 can be formed in a way so as to be formable into a container, however, as used herein, the term blank 100 can also include a blank sheet of material that can be used for any purpose.

The substrate 101 can include a coat weight of about 60 lbs/MSF in certain embodiments. In certain embodiments, the substrate 101 can be about 60 mils thick. With such a coat weight and thickness, the substrate 101 can have a density of about 3 lbs/(MSF*mils). Any other suitable coat weight, thickness, or density is contemplated herein.

The blank 100 can include one or more recyclable fluid resistant layers 103*a*, 103*b* on the first side 101*a* of the substrate 101 configured to prevent water and/or oxygen from passing through to the substrate 101, for example. As shown in FIG. 2, the one or more recyclable fluid resistant layers 103*a*, 103*b* can be configured to be an outside of the package 200.

The blank 100 can include a recyclable fluid permeable layer 105 disposed on the second side 101*b*. The fluid permeable layer 105 can be configured to allow a controlled amount of a fluid transmissibility and/or absorption (water and/or oxygen) by or through the fluid permeable layer 105 (e.g., to allow water to be absorbed by the substrate 101). In certain embodiments, the fluid permeable layer 105 can be a continuous layer without any perforations, e.g., such that it is materially and/or chemically configured to provide the desired water and/or oxygen permeability. In certain embodiments, the fluid permeable layer 105 may have one or more perforations as well.

In certain embodiments, the recyclable fluid permeable layer 105 can have or provide a 30-minute Cobb of about 10 g/m² to 15 g/m², for example. Any other suitable Cobb rating is contemplated herein (e.g., to allow water from frozen foods to permeate at a desired rate without causing sticking or weakening of the substrate 101 due to water saturation). In certain embodiments, e.g., as shown the recyclable fluid permeable layer 105 can be the only layer on the second side 101*b* of the substrate 101.

In certain embodiments, the recyclable fluid permeable layer 105 can be made of acrylic (e.g., of a thickness and/or otherwise configured to provide a desired Cobb rating). Any other suitable material is contemplated herein to provide the desired Cobb rating.

The recyclable fluid permeable layer 105 can have a coat weight of about 1.5 lbs/MSF to about 2.5 lbs/MSF, for example. For example, the recyclable fluid permeable layer 105 can have a coat weight of about 2 lbs/MSF. Any suitable coat weight, density, and/or thickness is contemplated herein.

The one or more recyclable fluid resistant layers 103*a*, 103*b* can have or provide a 30-minute Cobb of less than about 2 g/m². For example, in certain embodiments, the one or more recyclable fluid resistant layers 103*a*, 103*b* have or provides a 30-minute Cobb of about 0 g/m² such that the one or more recyclable fluid resistant layers 103*a*, 103*b* are substantially water impermeable (e.g., the Cobb rating being provided by any combination of resistant layers or being individually provided, e.g., in the case of multiple layers).

In certain embodiments, the one or more recyclable fluid resistant layers 103*a*, 103*b* include at least two layers 103*a*, 103*b* as shown in FIG. 1. The at least two layers 103*a*, 103*b* can include a first layer 103*a* disposed on the substrate 101, and a second layer 103*b* disposed on the first layer 103*a*.

In certain embodiments, the at least two layers 103*a*, 103*b* can be polymeric layers, for example (e.g., configured to provide water impermeability or other desired Cobb rating). Any other suitable material to provide the desired water resistance/impermeability is contemplated herein. Any suitable number of layers (e.g., one, two, three, etc.) to provide any suitable desired characteristic (e.g., water resistance/impermeability) is contemplated herein.

In certain embodiments, the first layer 103*a* can include pigment. In certain embodiments, the first layer 103*a* can be an adhesive backed double reflective air and vapor control layer (AVCL) and is bonded to the substrate 101 with the adhesive. For example, the first layer 103*a* can be Vapor-Base™ 200 Polymeric Coating sold by Michelman, Inc. of 9080 Shell Road, Cincinnati, OH 45236-1299 USA. In certain embodiments, the second layer 103*b* can be Vapor-Coat® 2200R sold by Michelman, Inc. of 9080 Shell Road, Cincinnati, OH 45236-1299 USA. Any other suitable materials are contemplated herein.

In accordance with at least one aspect of this disclosure, referring to FIG. 2, a container 200 for holding a frozen item (not shown) can include a substrate 101 comprising a recyclable paper, one or more recyclable fluid resistant layers 103*a*, 103*b*, and a recyclable fluid permeable layer 105 as described above with respect to embodiments of a blank 100. The container 200 can be configured such that the recyclable fluid permeable layer 105 is an inside surface, e.g., as shown, on which the frozen item sits, for example.

The fluid permeable layer 105 can be located at least on a bottom of the container 200, for example. In certain embodiments, the fluid permeable layer 105 is located only on a bottom (e.g., one or more bottom panels) of the container 200. In certain embodiments, the fluid permeable layer 105 can be disposed on all inside surfaces. For example, a blank 100 can have the fluid permeable layer 105 disposed on all portions of the second side 101*a* and the container 200 can be folded or otherwise assembled from the blank 100. In certain embodiments, the blank 100 can have the fluid permeable layer 105 only on a portion of the second surface. Any suitable method to form the container 200 is contemplated herein (e.g., from a blank 100, formed first, then coated with the layers 103*a*, 103*b*, 105, etc.).

In certain embodiments, the frozen item is a frozen fish filet. Any other suitable frozen item, or any other suitable non-frozen item, is contemplated herein.

A method for forming a blank, e.g., a blank 100 can include comprising coating a first side 101*a* of a water (and/or oxygen) absorptive substrate 101 with one or more recyclable water resistant or recyclable water impermeable layers (e.g., layers 103*a*, 103*b*), and coating a second side 101*b* of the substrate 101 with a recyclable fluid permeable layer 105 having a controlled amount of fluid permeability to allow a controlled amount of a fluid transmissibility (water and/or oxygen vapor) and/or absorption by or through the fluid permeable layer 105. The method can include any other suitable method(s) and/or portion(s) thereof.

Embodiments can provide a recyclable paperboard for storing frozen fish fillets. Embodiments can include a 100% recyclable alternative to a double-sided waxed board used in the fishing industry for packaging frozen fillets of fish in block format. Embodiments can include a micro-perforated laminated paperboard. Embodiments can include a coating on both sides (e.g., different coatings on each side) of paperboard to achieve desired functional properties. For example, embodiments can use laminated film on one or both sides of the board to achieve required properties.

Paperboard can be coated and recyclable whereas the traditional products are not recyclable. For example recyclable coatings can be put on both sides of the paperboard, while meeting specific requirements to protect the frozen fish fillets from freezer burns when stored over a long period of time (e.g., about 6 mo. to about 1 year). Specific coatings can be applied to meet the critical properties that need to be controlled such as water and oxygen vapor transmission rates.

The inside of the coated paperboard that contacts the fish can also have critical properties to allow for ease of release and controlled board absorption of water during the freezing and pressure process. After the frozen period ends, it is desirable for the coated paperboard to release easily from the frozen fish block and it is also desirable to have no to minimal oil flash when the frozen fish are cut into pieces and fried in hot oil.

Certain embodiments can utilize Kraftpak® paperboard sold by Westrock or similar paperboard as the substrate, e.g., because of its bulkiness and ability to absorb water when undergoing the freezer/pressing process. Also, Kraftpak® has a density that is as much as 25% lower than conventional folding carton paperboards. However, the substrate could be any suitable paperboard (e.g., Kraftpak®, linerboard, etc.) with a selected amount of absorptivity In embodiments, on the exterior face of the paperboard, a double-sided coating can be applied which can provide about 0 $g/m^2$ water absorption and less than about 35,000 $cc/m^2$ per day of oxygen. The outside coating can utilize a double-bump coating application. The first layer can be a basecoat (e.g., VaporBase™ 200) that can be a polymeric coating with pigments designed to seal up the surface. The second layer can be the topcoat (e.g., Michelman® VC2200R) and can be a polymeric coating only designed to further seal the surface and reduce 30-minute water Cobb rating to less than about 5 $g/m^2$ (e.g., targeting 0 $g/m^2$).

On the interior face for contacting fish, for example, a single side coating can be applied which has a water freeze and pressure absorption rate that is up to 70% of the paperboard weight and a 180-degree peel release force of less than 140 gram-force (e.g., a single layer of Acrylic coating that is recyclable) The inside coating layer can be a single application coated layer. It can be an acrylic based coating (e.g., Michelman® X300AF), e.g., designed to get 30-minute water Cobb of 10 $g/m^2$.

Embodiments can be used in frozen food packaging. Any other field of use is contemplated herein.

Containers and/or blanks can include any suitable adhesive applied to any suitable panel thereof for any suitable purpose. Any suitable foldable line types are contemplated herein (e.g., perforated, creased, cut/creased, etc.). Any suitable panel arrangement (e.g., more or less panels in any suitable location) is contemplated herein. Any suitable container shape is contemplated herein. Any suitable blank shape is contemplated herein.

While embodiments have been described and shown above, any suitable panels and/or other design for a blank to form a package as disclosed above is contemplated herein. Any suitable material for use (e.g., paper, cardboard, plastic board, etc.) and/or one or more combinations thereof are contemplated herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A blank for a package comprising:
  a substrate comprising a recyclable paper, the substrate having a first side and a second side opposite the first side;
  one or more recyclable fluid resistant layers on the first side of the substrate configured to prevent water and/or oxygen from passing through to the substrate, the one or more recyclable fluid resistant layers configured to be an outside of the package, wherein the one or more recyclable fluid resistant layers include at least two layers comprising a first layer and a second layer, wherein the first layer includes adhesive and is bonded to the substrate with the adhesive; and
  a recyclable fluid permeable layer comprising coating directly disposed on the second side and configured to allow a controlled amount of a fluid transmissibility and/or absorption by or through the fluid permeable layer.

2. The blank of claim 1, wherein the recyclable fluid permeable layer has or provides a 30-minute Cobb of about 10 g/m$^2$ to 15 g/m$^2$.

3. The blank of claim 1, wherein the recyclable fluid permeable layer is made of acrylic.

4. The blank of claim 3, wherein the recyclable fluid permeable layer has a coat weight of about 1.5 lbs/MSF to about 2.5 lbs/MSF.

5. The blank of claim 4, wherein the recyclable fluid permeable layer has a coat weight of about 2 lbs/MSF.

6. The blank of claim 3, wherein the recyclable fluid permeable layer is the only layer on the second side of the substrate.

7. The blank of claim 6, wherein the one or more recyclable fluid resistant layers have or provides a 30-minute Cobb of less than about 2 g/m$^2$.

8. The blank of claim 7, wherein the one or more recyclable fluid resistant layers have or provides a 30-minute Cobb of about 0 g/m$^2$ such that the one or more recyclable fluid resistant layers are substantially water impermeable.

9. The blank of claim 1, wherein the
  the first layer is disposed on the substrate; and
  the second layer is disposed on the first layer.

10. The blank of claim 9, wherein the at least two layers are polymeric layers.

11. The blank of claim 10, wherein the first layer includes pigment.

12. The blank of claim 9, wherein the first layer is an adhesive backed double reflective air and vapor control layer (AVCL).

13. The blank of claim 1, wherein the substrate is paperboard.

14. The container of claim 13, wherein the recyclable fluid permeable layer is an inside surface of container, wherein the coated paperboard that contacts a food product allows for ease of release.

15. The blank of claim 13, wherein the paperboard is 100% virgin paperboard.

16. The blank of claim 1, wherein one or more recyclable fluid resistant layers on the first side of the substrate comprising a coating.

17. The blank of claim 1, wherein the fluid permeable layer is a continuous layer.

18. A container for holding a frozen item, comprising:
  a substrate comprising a recyclable paper, the substrate having a first side and a second side opposite the first side;
  one or more recyclable fluid resistant layers on the first side of the substrate configured to prevent water and/or oxygen from passing through to the substrate, the one or more recyclable fluid resistant layers configured to be an outside of the package, wherein the one or more recyclable fluid resistant layers include at least two layers comprising a first layer and a second layer, wherein the first layer includes adhesive and is bonded to the substrate with the adhesive; and
  a recyclable fluid permeable layer comprising coating directly disposed on the second side and configured to allow a controlled amount of a fluid transmissibility and/or absorption by or through the fluid permeable layer, wherein the container is configured such that the recyclable fluid permeable layer is an inside surface on which the frozen item sits.

19. The container of claim 18, wherein one or more recyclable fluid resistant layers on the first side of the substrate is configured to prevent water and/or oxygen from passing through to the substrate, wherein the one or more recyclable fluid resistant layers on the first side of the substrate comprising a coating.

20. A method for forming a blank, comprising:
  coating a first side of a water absorptive substrate with one or more recyclable water resistant or recyclable water impermeable layers; and
  coating a second side of the substrate with one or more recyclable fluid permeable layer having a controlled amount of fluid permeability configured to allow a controlled amount of a fluid transmissibility and/or absorption by or through the fluid permeable layer, wherein the one or more recyclable fluid resistant layers include at least two layers comprising a first layer and a second layer, wherein the first layer includes adhesive and is bonded to the substrate with the adhesive.

* * * * *